United States Patent [19]

Frichette et al.

[11] 4,278,162
[45] Jul. 14, 1981

[54] FRICTION DISC

[75] Inventors: Ross S. Frichette, Strongsville; Ronald E. Grambo, Cleveland; Robert W. Biggs, Chagrin Falls, all of Ohio; Thomas A. Healy, deceased, late of Rocky River, Ohio, by Antoinette M. Healy, executrix

[73] Assignee: The S. K. Wellman Corp., Bedford, Ohio

[21] Appl. No.: 49,140

[22] Filed: Jun. 18, 1979

[51] Int. Cl.³ .............................................. F16D 13/60
[52] U.S. Cl. .................................................. 192/107 C
[58] Field of Search .......... 192/107 C, 109 B, 107 M, 192/107 R

[56] References Cited

U.S. PATENT DOCUMENTS

| 2,408,441 | 10/1946 | Nutt | 192/107 C |
| 2,888,122 | 5/1959 | Garmager | 192/107 C |
| 3,809,200 | 5/1974 | Smales | 192/107 C |
| 4,113,078 | 9/1978 | Commander | 192/107 C |

FOREIGN PATENT DOCUMENTS 1418890  12/1975  United Kingdom ................ 192/107 C Primary Examiner—George H. Krizmanich
Attorney, Agent, or Firm—Pearne, Gordon, Sessions, McCoy & Granger

[57] ABSTRACT

A plurality of friction buttons in a standardized clutch disc assembly, wherein the friction buttons are arranged to be secured by rivets or the like to marcel springs in a manner which permits the full cushioning function of the marcel springs to be maintained, and permits the friction buttons on one face of the disc to back up those of the other face to achieve substantially uniform pressure loading on the friction buttons.

9 Claims, 4 Drawing Figures

FRICTION DISC

BACKGROUND OF THE INVENTION

The invention relates to friction disc assemblies, and in particular to improvements in facings for automotive-type clutches.

PRIOR ART

A common type of dry automotive clutch plate includes annular friction facings in the form of unsegmented or full rings compounded of organic-based friction materials, such as asbestos. Marcel or wave springs are ordinarily axially interposed between these annular friction facings to cushion the engagement action of the clutch. This cushioning action results as the marcel springs are flattened during engagement of the clutch when the annular facings are axially compressed towards one another.

Commonly, the organic or asbestos friction material is attached to the marcel springs by a series of rivets. Asbestos-based friction facings have a long history of satisfactory performance under normal conditions. However, under heavy duty service, the performance of such asbestos or other organic materials on occasion can be less than that desired. There has been a relatively recent awareness of the possible harmful effects on human health of breathing airborne asbestos dust. As a result, there exists a need for substitute friction materials in clutch designs.

Various approaches have been taken in the past to substitute other substances for asbestos-based and like organic friction materials. Sintered metallic friction materials have long been known. Such metallic friction materials are capable of sustaining higher unit energy levels than those which are practical with asbestos or like friction materials. The practical high unit energy levels of sintered metallic friction materials allow such materials to be employed in the form of buttons or other patterns with surface areas much reduced from those otherwise required. The past developments and utilization of metallic friction materials have often been associated with clutch assemblies designed specifically for metallic materials. This circumstance has limited the adaption of metallic friction materials in many automotive applications and markets. For example, full ring facings of metallic friction material will work in any of the more severe clutch applications but are too heavy for use in lighter vehicle clutches.

SUMMARY OF THE INVENTION

The invention provides a metallic friction button assembly for use in conventional clutch disc units in substitution for annular full ring friction facings of asbestos and like organic materials. The friction button assemblies are compatible with standardized clutch plate designs and are adapted to take full advantage of the cushioning function afforded by the marcel springs of such designs. The flywheel energy of a rotating clutch plate lined with the disclosed metallic friction button assemblies is generally less than, but at least no greater than, that of a clutch plate faced with full ring asbestos or like organic materials.

Clutch assemblies built with the disclosed button friction assembly have improved performance characteristics when measured with those of organic-based friction materials. Through their compatibility with standardized clutch carrier plate elements, the disclosed friction buttons reduce manufacturing costs in several direct ways. Existing tooling can be used to produce a clutch carrier plate. Standard rivets and riveting devices and technology are used to secure the button assembly to the carrier plate. Inventory can be minimized, since much of the same hardware can be employed in the manufacture of complete units incorporating the friction button assemblies of the invention or conventional units using annular friction facings.

The invention has high applicability in the rebuilder market, since the friction button assemblies may be employed to convert used carrier plates with worn annular friction facings to better performing metallic units. This conversion can be accomplished without any modification to the carrier plate.

An added benefit of the metallic friction button assemblies of the invention is their avoidance of the health hazards attendant with the use of asbestos-based friction materials.

In a disclosed embodiment, The friction button assembly is comprised of a metal core to which is bonded a metallic friction pad. Each friction pad has a line of symmetry which, upon installation on the clutch carrier plate, is radial in orientation. The symmetry of the pads allows them to be paired, one on each face of the carrier plate, in superposed or backed up relation to develop uniform pressure loading. Each metal core is asymmetrical with respect to the disc pad symmetry line, enabling it to be advantageously riveted to one portion of an associated marcel spring and to the same relative portion of a separate marcel spring. The asymmetry of the attachment of the core avoids interference with the cushioning action of the marcel springs.

DESCRIPTION OF THE PREFERRED EMBODIMENT

Figure 1:
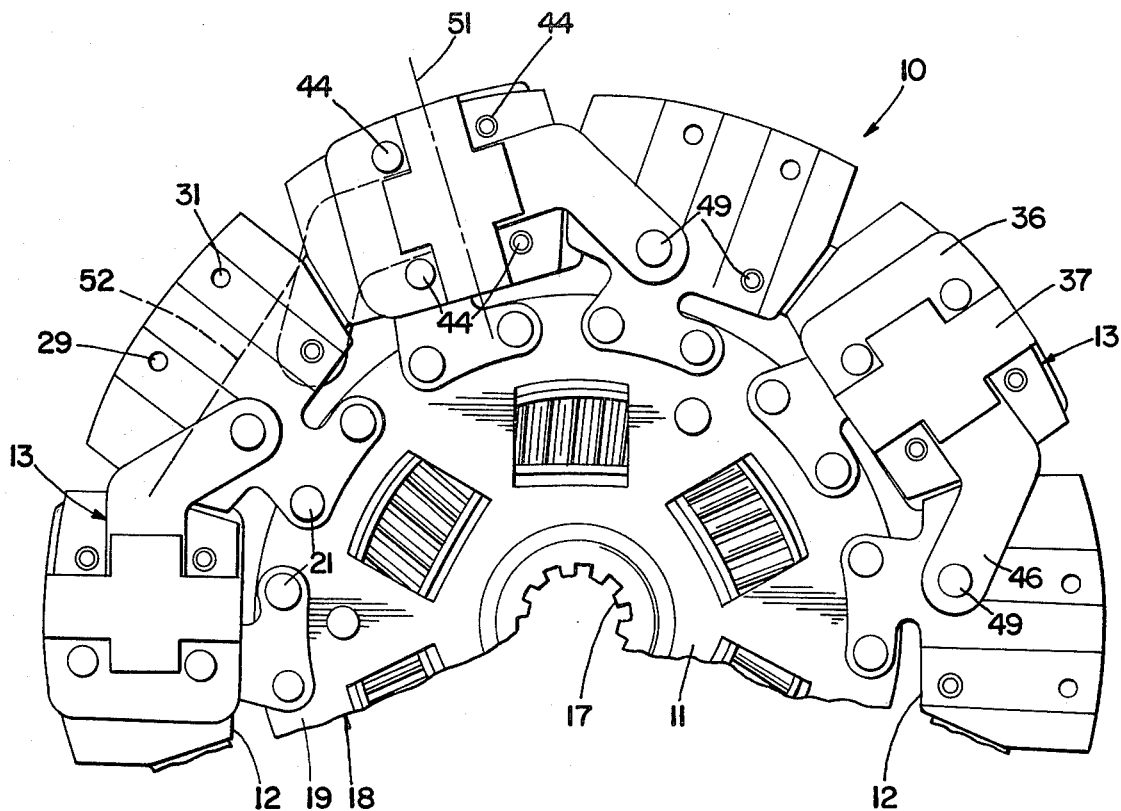
FIG. 1 is a fragmentary axial view of one face of a clutch plate embodying the invention.
Figure 2:
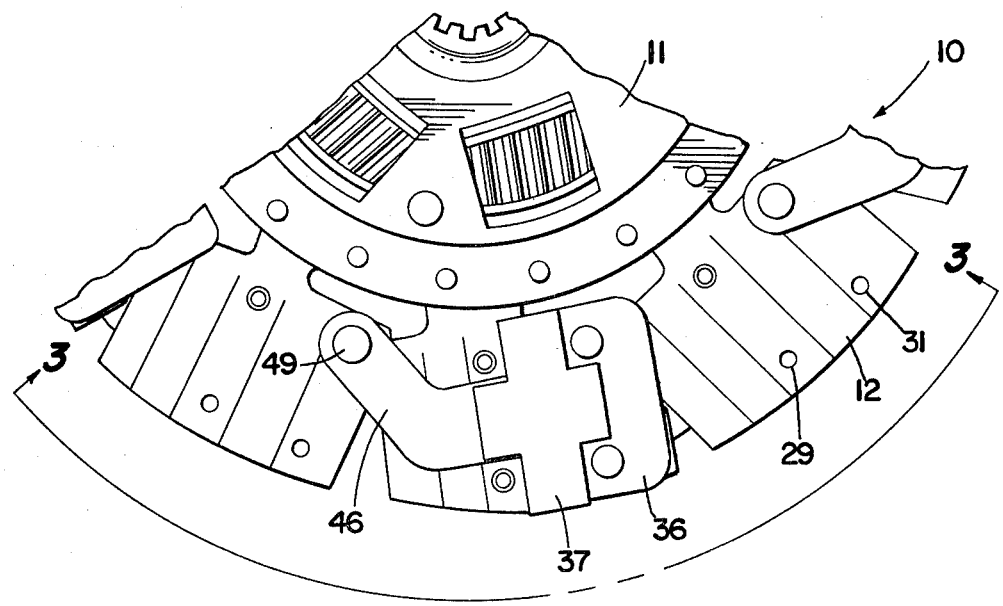
FIG. 2 is a fragmentary axial view of the opposite face of the plate illustrated in FIG. 1.
Figure 3:
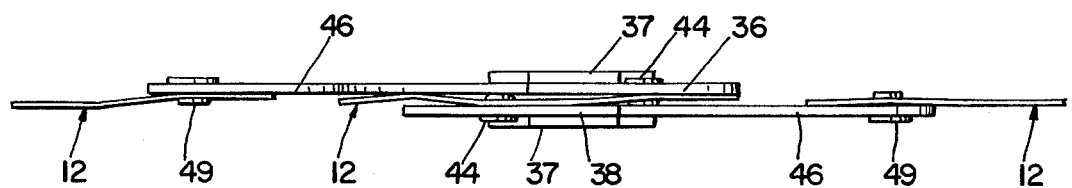
FIG. 3 is an edge view of the clutch disc unit taken along the line 3—3 in FIG. 2.
Figure 4:
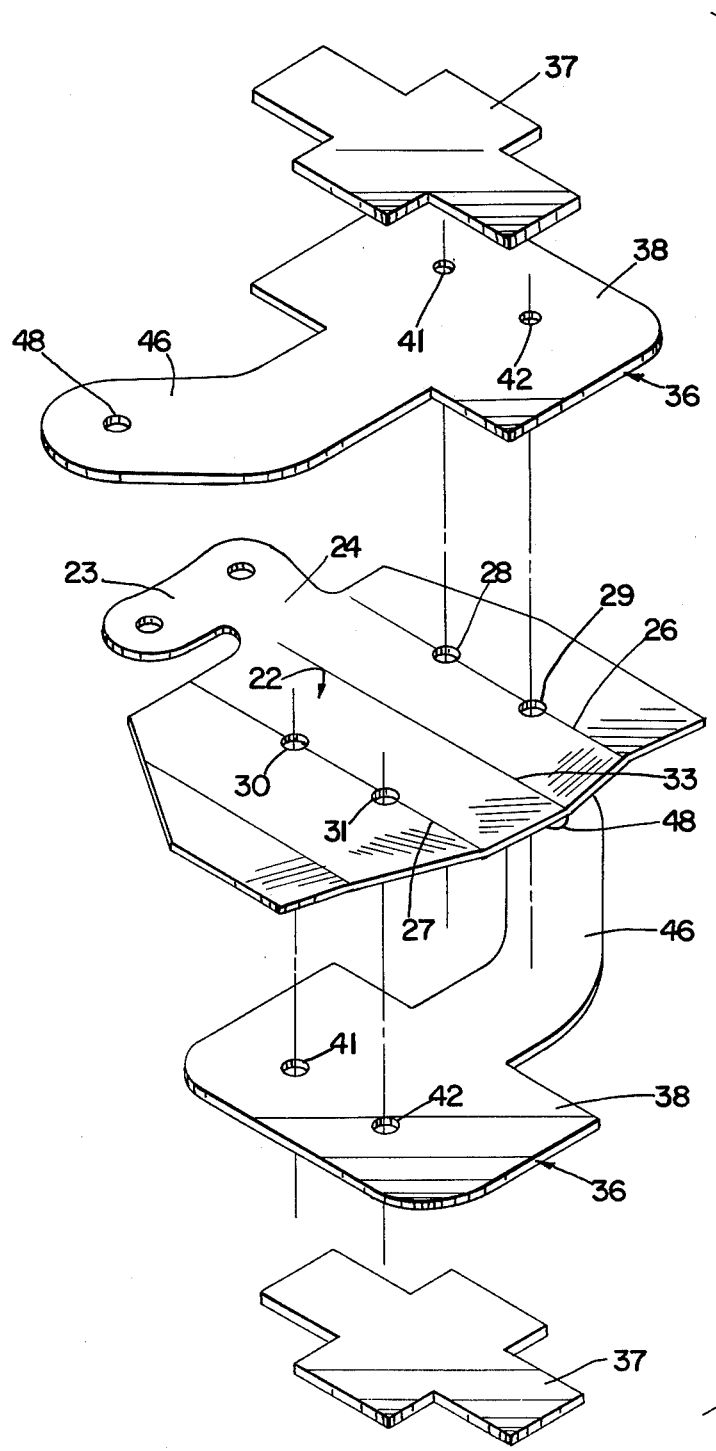
FIG. 4 is an exploded, perspective view, on an enlarged scale, of a pair of superposed friction button assemblies on opposite faces of a common marcel spring.

Referring now to the drawings, there is illustrated a dry clutch disc unit 10 having a carrier plate which comprises a hub assembly 11 and a plurality of marcel springs 12 evenly spaced about the periphery of the hub assembly. Secured to the marcel springs 12 at both faces of the unit 10 are friction button assemblies 13.

At its center, the hub assembly 11 is provided with a keyed or splined bore 17. Surrounding this bore 17 the hub assembly 11 includes a damper mechanism indicated generally at 18.

Each of the marcel springs 12 is fixed to a circular plate 19 of the damper mechanism 18 by a pair of circumferentially spaced rivets 21. In the illustrated case, the marcel springs 12 are formed as individual stampings and are dimensioned such that there is a small circumferential spacing between their radial edges. It is contemplated, however, that the springs could overlap where desired, or could be formed of a single piece and be integrally joined at their roots in the area of the hub assembly 11 or elsewhere.

The illustrated marcel springs 12 are of a standard, conventional design fabricated of sheet steel spring stock. The major section 22 of a marcel spring 12 is connected to a riveted, anchored section 23 through an integral web 24 of reduced circumferential extent. The major spring section 22 is stamped into a nonplanar configuration having a pair of friction button support portions 26, 27 in the area of associated rivet holes 28, 29 and 30, 31, respectively. The support portions 26 and 27 are joined by an integral, intermediate portion 33 which in a free state has a generally helical orientation with respect to the axis of the disc unit 10, thereby providing a radially aligned wave. The sets of holes 28, 29, and 30, 31 are generally radially oriented with respect to the center of the disc unit 10 and are equal in diameter.

Each friction button assembly 13 includes a planar steel core 36 and a planar pad of friction material 37. Ideally, the friction material of the pad 37 is a sintered, metallic material known in the art and bonded by brazing to the steel core 36. A main body 38 on the core 36 has dimensions somewhat greater than the corresponding dimensions of the friction pad 37. Holes 41, 42 in the main core body 38 are matched to the holes 28-31 of the marcel springs in diameter and spacing to permit a button assembly 13 to be fixed to an associated marcel spring 12 by rivets 44. Ideally, the friction material pad 37 is spaced slightly from the holes 41, 42, and edges of the main core body 38 for satisfactory automatic brazing results. A stabilizer strap or finger 46 is integrally formed with the main core body 38 and is also provided with a hole 47 matched in size and center-to-center distance to align with an inner hole 28, 30 of an adjacent marcel spring 12.

A plurality of the friction button assemblies 13, identical in form, are evenly distributed about the periphery of the disc unit 10 on both of its faces. In the illustrated embodiment, the button assemblies 13 are disposed on alternate marcel springs 12. The stabilizer fingers 46 on each face of the disc unit are arranged in the same direction, e.g., all pointing clockwise when viewed directly at its particular face. Each stabilizer finger 46 is fixed to an intervening, adjacent marcel spring 12 by rivets 48. The hole to which a stabilizer finger 46 is riveted corresponds to that with which one of the pair of holes the main body 38 is associated. Where the core 36 is attached to a leftward set of holes 28, 29, the respective finger is attached to one of the leftward holes of the intervening or adjacent marcel spring.

Inspection of the figures reveals that the marcel springs 12 are allowed to function in their ordinary manner by flattening out without restriction by the manner of rivet attachment of the friction button assemblies. Specifically, any effective circumferential spreading of the hole pairs 28, 29 and 30, 31 when the spring 12 is flattened is not restricted by such button assemblies. As indicated, the button assemblies 13 are configured to avoid any overlapping of the rivet heads associated with the button assembly and the same marcel spring but on the opposite face of the disc unit.

In its installed condition, each of the button assemblies 13 has an axis of symmetry 51 defined by its associated friction pad 37 which passes through the center of the disc 10. The line of symmetry is centered with respect to the holes 28-31 so that the line of symmetry of each button assembly overlies that of the opposite button assembly. With such geometry, the full area of the friction pad 37 is backed up or supported by the opposite friction pad 37. This back-up or full support assures even compression of the related marcel springs 12 and uniform wear when the disc unit 10 is compressed between confining surfaces, such as by a pressure plate and flywheel. The illustrated cross pattern of the friction pads 37 provides a satisfactory pressure loading and swept area on mating surfaces of the pressure plate and flywheel.

The disclosed hub assembly 11 with its damper mechanism 18 and the marcel springs 12 are representative of that of a conventional class of automotive-type clutch disc units. These elements form the carrier plate of a complete clutch unit which ordinarily carries a pair of full ring organic friction facings which are customarily riveted to the marcel springs. When worn out, such facing rings may be stripped from the carrier plate and replaced with a plurality of the friction button assemblies 13 in the manner disclosed. Where desired, the outer half of the intervening marcel springs to which the stabilizer fingers 46 are attached may be cut off, as suggested by the dotted line 52 in the ten o-clock position of FIG. 1. The sintered metallic friction pads 37, when compared to conventional organic friction facing materials, to provide a unit which is more suitable for heavy automotive use and light truck duty.

Although the preferred embodiment of this invention has been shown and described, it should be understood that various modifications and rearrangements of parts may be resorted to without departing from the scope of the invention as disclosed and claimed herein.

What is claimed is:

1. A clutch disc assembly comprising a keyed hub, a plurality of separate marcel springs fixed circumferentially about and extending radially from the hub, each marcel spring being formed of resilient sheet material, having a permanent nonplanar set in a free state and being capable of assuming a generally planar configuration when axially compressed, a plurality of friction buttons disposed on each face of the disc, means securing each friction button to at least one marcel spring, said securing means being free of contact with said hub and being arranged to transmit torque forces on said friction buttons to said hub exclusively through said marcel springs while permitting substantially free movement of said marcel springs between their free nonplanar and compressed planar states, each of said friction buttons including a friction surface on one face of the disc being paired in substantially complete superposition with a friction surface of a button on an opposite face of the disc.

2. A clutch disc assembly as set forth in claim 1, wherein said friction surface is provided by a friction pad having a radial line of symmetry, said friction pad being secured to a core, said core being attached to a respective marcel spring by securing means asymmetrically arranged with respect to said line of symmetry.

3. A clutch disc comprising a hub, a plurality of steel marcel springs of substantially identical construction joined to the hub in a circumferential pattern extending radially away from the hub, each marcel spring in a free state having a generally radially oriented wave portion intermediate circumferentially spaced support portions, each of said marcel springs being adapted to be axially compressed from its free state into a flattened, generally planar configuration, a plurality of friction button assemblies on said marcel springs in a circumferentially spaced pattern on each face of the disc, said marcel spring support portions having rivet holes in a regular pattern radially outward of said hub, said friction button assemblies including a metallic friction pad bonded to a steel core, the steel cores each having a rivet hole pattern corresponding to that of the marcel spring support portions, each button assembly on one face of the disc being superposed with a button assembly on the opposite disc face, the friction pads having a radial line of symmetry such that when superposed they are supported in compression substantially through their full area by the opposite friction pad, said steel core being riveted to said marcel springs through their respective rivet holes in a manner wherein said friction button assemblies transmit torque forces to said hub exclusively throuh said marcel springs while said steel cores substantially avoid restriction of flattening compression of said marcel springs.

4. A clutch disc assembly comprising a hub, a plurality of marcel springs of substantially identical construction joined to the hub in a circumferential pattern and extending radially away from the hub, each marcel spring in a free state having a generally radially oriented wave portion intermediate circumferentially spaced support portions, each of said marcel springs being adapted to be axially compressed from its free state into a flattened, generally planar configuration, a fastening hole arrangement radially outward of the point of juncture between said hub and the respective marcel spring associated with each spring support portion, at each face of the disc assembly a plurality of friction buttons each mounted on a respective marcel spring, said friction buttons each having a first rivet hole arrangement matched to the fastening hole arrangement associated with a particular support portion of its respective marcel spring with angular reference to a clockwise or counterclockwise direction on such respective marcel spring and a second rivet hole arrangement matched to the fastening hole arrangement of a support portion of an adjacent marcel spring having the same angular reference to the adjacent marcel spring as that of said particular hole arrangement to its respective marcel spring, rivets disposed in said hole arrangements securing said friction buttons to said marcel springs, in a manner wherein torque forces on said friction buttons are transmitted to said hub exclusively through said springs.

5. A clutch disc assembly as set forth in claim 4, wherein each friction button is an assembly of a friction pad and a core, the core providing said friction button hole arrangement.

6. A clutch disc assembly as set forth in claim 5, wherein each of said friction pads has a radial line of symmetry and is superposed on a friction pad on an opposite face of the disc.

7. A clutch disc assembly as set forth in claim 4, wherein each of said cores comprises a generally planar main body and an integral stabilizer, said main body overlying said associated marcel spring and providing said hole arrangment, said stabilizer overlying said adjacent marcel spring and providing said second rivet hole arrangement.

8. A clutch disc assembly as set forth in claim 7, wherein said stabilizers are in the form of elongated fingers and at each face of the disc point in the same angular direction.

9. A friction button assembly for refacing a standard clutch disc comprising a steel core and a metallic friction pad bonded to the steel core, said core having a pair of equal-size holes of predetermined spacing adapted to align with a corresponding pair of generally radially spaced and radially aligned inner and outer holes in a marcel spring of a clutch disc, the area of the core immediately surrounding the periphery of said holes being free of overlying areas of said friction pad, the friction pad having a line of symmetry offset from a line connecting said core holes and being substantially radial to the center of the disc when installed thereon, the core having a stabilizer portion free of an overlying portion of the friction pad, said stabilizer portion having a rivet hole equal in size to that of said pair of equal-size holes and having a location with respect to the first-mentioned pair of holes and line of symmetry of the friction pad such that it is adapted to align with one of the inner and outer holes on the adjacent marcel spring on the clutch disc.

* * * * *